Patented Feb. 1, 1949

2,460,356

UNITED STATES PATENT OFFICE 2,460,356

PROCESS OF MAKING CERAMIC BODIES

Ekkehard L. Kreidl, Boston, and Joseph L. Utter, North Easton, Mass., assignors to Arthur D. Little, Inc., Cambridge, Mass., a corporation of Massachusetts No Drawing. Application April 30, 1947, Serial No. 745,096

14 Claims. (Cl. 49—79)

This invention relates to forming strong ceramic bodies, and more particularly to ceramic bodies formed by molding dry powder under high pressures.

It is known that certain finely divided inorganic materials when subjected to considerable pressure will, upon heating sufficiently, bond, and/or recrystallize. The heating necessary to promote bonding is below that which will fuse the material. Particularly suitable materials for the present invention are disclosed in the U. S. Patent 2,362,430 to Martin J. Buerger, and application Ser. No. 657,628, filed March 27, 1946, of Martin J. Buerger and Edward Washken. The materials disclosed there are termed "plastically deformable," and a method for determining plastic deformation and deformability is set forth in the above-named two references.

A difficulty with previously prepared ceramic materials is that if they are fired above the recrystallization point, but below the fusion point, they will be moderately strong but are subject to a small amount of shrinkage, while if they are fired just below the recrystallization point they are undesirably weak.

It is an object of the present invention to prepare molded, fired ceramic products which are strong and which may be molded to the size required.

This and other objects may be accomplished by molding a mixture of finely divided inorganic refractory material and at least 2% by weight of a powdered glass having a melting point which is less than the fusion temperature of the refractory material under a pressure of at least about 5 tons per square inch, firing the molded structure, cooling, impregnating the structure with an inorganic gel produced from a partially or completely hydrolyzed compound of an inorganic oxide having glass forming characteristics, and refiring.

The essence of this invention lies in the two step process of treating dry molded ceramic materials which includes a first step of firing pressed finely divided particles of refractory material mixed with a small amount of a finely divided glass, and a second step of impregnating the fired piece with a glass-forming hydrolyzate and refiring.

With respect to the firing schedules used it has been found that the first fire need not be as high as the second fire and in many cases will be kept lower for obtaining optimal results. The first fire should be high enough to impart sufficient strength to the body without reducing its porosity below that which will permit satisfactory utilization of the impregnation process, i. e. above 0.5%. We have found that for the first fire, temperatures will be satisfactory which will consolidate the refractory material and will be at or above the softening point of the glass addition, but substantially below the fusion temperature of the refractory material. Generally we prefer to keep the material at the firing temperature for brief periods of time only, even though as much as 3 hours have been used at maximum temperature without undesirable effects.

For the second fire, that is the fire subsequent to impregnation, we have found that temperatures above the melting point of the glass, but below the fusion temperature, and preferably even below the recrystallization temperature of the refractory, should be used. Also in this case we prefer to keep the material at peak temperature for brief periods of time only.

For the purposes of this invention, it has been found that calcium fluoride (fluorite) is a satisfactory refractory material, lead borate a satisfactory low melting glass, and at least partially hydrolyzed ethyl silicate a good impregnant. A typical process for making the improved ceramic materials will therefore be described using these materials. It is not intended that this invention be limited to these materials since other materials, as described below, are full equivalents for them.

Calcium fluoride was ground to a 150 mesh or finer powder. Thoroughly incorporated with the ground calcium fluoride was 7% by weight of a lead borate (23% $B_2O_3$, 77% PbO by weight) glass also ground to a similar fineness, and 4% by weight of Carbowax (polyethylene glycol) as a temporary binder. The mixture was placed in a mold and compressed with a pressure of 40 tons per square inch. The piece was removed from the mold and placed in an oven. The oven temperature was raised fairly rapidly to 750° C., and on reaching that temperature was immediately allowed to cool. Thus the piece was subjected to the 750° C. temperature for only a short period of time. After the cooling, the piece was placed in a vacuum chamber and evacuated 5–15 min., after which hydrolyzed ethyl silicate was run onto it. The thus impregnated piece was placed in an oven which was then raised fairly rapidly to a temperature of 900° C., and on reaching that temperature was immediately allowed to cool. The increase in modulus of rupture was 2 to 2½ times that obtainable by previous methods and compositions of calcium fluoride.

The explanation of this increase in strength is not at present known. We do know, however, that it is not merely an increase in strength due to the addition of glass plus the increase due to impregnation. Calcium fluoride finely divided and compressed as above, but with neither the glass nor the ethyl silicate, and fired for 3 hours at 900° C., had an average modulus of rupture of 4320 lbs./sq. in. Fluorite without addition of the glass, but impregnated with the ethyl silicate and otherwise treated as described in the two step process outlined above, had an average modulus of rupture of 6660 lbs./sq. in. On the other hand, using that same process with the glass but without the ethyl silicate, the product had an average modulus of rupture of 5190 lbs./sq. in. These figures contrast sharply with that for the fluorite treated with both the glass and the ethyl silicate in accordance with the foregoing example, which had an average modulus of rupture of 10016 lbs./sq. in.

This surprisingly large increase is wholly unpredictable from the increases due to the sum of the two factors (glass and ethyl silicate) separately, being in fact about twice that sum.

Several different theories may be advanced to explain their increase in modulus. The most probable, at the present time, appears to be that the glassy phase tends to cushion strains created on incipient recrystallization of the body. The addition of hydrolyzed ethyl silicate in the form of a gel apparently tends to bridge across imperfections and upon firing leaves a rigid structure, possibly by interaction with the glassy phase, and a surface, at least, free from imperfections.

An unexpected but desirable quality of the products of this invention may be illustrated by the calcium fluoride-lead borate-hydrolyzed ethyl silicate product. The products of this invention have a far lower power factors from low cycles to the centimeter wave region than those made by previous methods as shown in the following table:

*Power factor*

|  | 100 c. | 10 kc. | 1 mc. | 3 cm. |
|---|---|---|---|---|
| Impregnated-lead-borate-fluorite material | .0025 | .0025 | .0006 | .00018 |
| Straight Fluorite | .0986 | .0663 | .0091 | .0006 |

The procedure outlined above must be strictly observed. If, for instance, unhydrolyzed ethyl silicate solution is used in place of the at least partially hydrolyzed colloidal suspension or gel thereof, no appreciable advantage is attained over the results with no ethyl silicate at all. However, hydrolysis can be effected in situ during impregnation, although no particular advantages are found in so doing. If the impregnation step is carried out before the first firing, instead of before the second, no worthwhile increase in strength is secured.

The temperature of firing depends upon the characteristics desired in the final product. The temperature in any case must be below the fusing point of the refractory material, as already pointed out. A slight amount of shrinkage, in the order of about 1%, is experienced if the firing is carried out at a temperature above that which will cause recrystallization for a period of time sufficient to cause recrystallization. Practically no shrinkage is apparent, however, if the temperature of firing is below that at which recrystallization takes place. It is in this latter range that the process of this invention is particularly useful because products fired at such low temperatures by previously known methods are undesirably weak. A marked increase in strength is obtained, however, whether the firing is carried out either below or above the recystallization point.

The recrystallization point (which may be readily determined by X-ray diffraction patterns) for calcium fluoride is about 926° C. It can be seen from the firing schedule above that substantial recrystallization was avoided. A repetition of the procedure employing a temperature of 1000° C. gave a corresponding increase in strength but was accompanied by a slight amount of shrinkage.

Other materials may be substituted for those set forth above. A considerable number of combinations is thus possible, and the selection of the components of each such combination can be made, as discussed below, in light of the properties of each component and the characteristics desired in the final product.

In place of the calcium fluoride other "plastically deformable" materials may be employed including aluminum oxide, and magnesium oxide. If these materials are used, higher melting glasses may also be employed. The recrystallization temperature of magnesium oxide is about 1220° C. and that of aluminum oxide somewhat higher. Thus, firing temperatures higher than those allowable with calcium fluoride are permissible. Corresponding increases in strength are obtained with alumina with the incorporation of glasses of a higher melting point than those described above with fluorite.

Other refractory materials which may be processed in accordance with this invention include zirconia ($ZrO_2$), zircon ($ZrSiO_4$), titania, and titanates such as those of calcium, barium, etc. Zirconia-magnesia mixtures — especially those preventing high temperature inversion of zirconia—as well as phosphates such as calcium phosphate, calcined kyanite, calcined steatite, and similar minerals may be advantageously treated by the two step process herein disclosed. Any other desired mixtures of the above may be treated by the process of this invention, if so desired.

As stated above, the minimum pressure that may be employed is 5 tons per square inch. It is preferred, however, to operate by pressing with at least 20 tons per square inch, and pressures in the order of 40 tons per square inch or more appear to be most practical where it is desired to take advantage of the property of plastic deformation.

Instead of hydrolyzed ethyl silicate, other hydrolyzable silicon compounds, such as $SiCl_4$, alkyl silanes, aryl silanes and aralkyl silanes may be employed herein. Other hydrolyzable compounds of inorganic oxides yielding a gel which will bond with the glass as described above may be employed. Such compounds include those which hydrolyze to $TiO_2$, $P_2O_5$, $ZrO_2$, $Al_2O_3$, and $B_2O_3$. These materials are glass network formers either of themselves or in combination with the ceramic surroundings.

Other glasses equivalent to lead borate containing glasses may be employed as addition agents to the powdered ceramic material. These include lead silicate, lead boro-silicates, and alkali metal and alkaline earth metal oxide containing glasses, as well as mixtures of these glasses.

The various glasses are not, however, equally effective, although useful. For instance 7% by weight of finely divided lead monosilicate was substituted for the 7% lead borate glass in the example above. Firing, impregnation, and refiring schedules were repeated. Examination showed that the product had a modulus of rupture of 6800 pounds per square inch. This compared with a strength of 4300 lbs./sq. in. of a fired calcium fluoride—7% lead silicate glass mixture without subsequent impregnation.

Lead borosilicate glass (55 PbO, 20 $SiO_2$, 25 $B_2O_3$) was substituted similarly and yielded a two step impregnated fired product having a strength of 9500 pounds per square inch.

Higher melting glasses suitable for use with the higher fusing ceramic materials include soda lime glass, and borosilicates of the Pyrex type, as well as phosphate glasses. The lower melting glasses may also be used, if desired, with the higher fusing ceramic materials. Glasses may be used generally which melt below the fusion point of the ceramic material except those which react so strongly with the non-glassy phase that a true mixture is not obtained. Glasses should be selected so that they are compatible with the network forming oxides, as well known to those skilled in the art.

It is essential that there be at least 0.5% porosity in the product obtained by the first firing. This porosity, to obtain proper strength, must not exceed 25%. The degree of porosity is governed by the fineness of the powdered material, the pressure employed in compressing the material, and the amount of glass employed and amount of binder used which is removed by firing. If the amount of glass is kept below 10% by weight, and the degree of fineness 100 mesh or finer, and the pressure at least 5 tons per square inch, the porosity will ordinarily exceed 0.5% and be less than 25%. While the quantity of glass mixed with the ceramic material is not critical, amounts in excess of 10% are of no added value, and large quantities, i. e. in the order of 33⅓% or greater, are to be avoided for the purposes of this invention.

In order to cause the powdered material to flow easily into the mold, this material is preferably granulated. The size of these granules is not critical and is governed by expediency or use in the molding apparatus available. Granulated powder may be prepared by mixing the finely divided ceramic material with a finely divided binder such as shellac. It is well also to use a mold lubricant so that the molded article may be removed easily. Some materials such as Carbowax (polyethylene glycol), hydrogenated cottonseed oil, and petroleum or paraffin waxes serve both as binders and as mold lubricants. The use of such binders is to be distinguished from the term "binder" as commonly used in the ceramic art. These latter include clay and feldspar, which add green strength and which later introduce a vitreous phase in the fired body. The "binders" used in the present invention are solely for the purpose of granulating the finely divided material and increasing the unfired strength, and are burned out during firing. In the accepted sense there is no binder used in the process of the present invention.

We claim:

1. A process for forming strong molded ceramic products comprising the steps of compressing a mixture of finely divided inorganic refractory material and a finely divided glass to a pressure of at least about 5 tons per square inch, said refractory material having a fusing point above the melting point of the glass, firing the compressed mixture to a temperature above the softening point of the glass and below the fusing point of the refractory, to form a product having a porosity of between 0.5% and 25%, impregnating said product with a compound which is at least partially hydrolyzed and is in the form of an inorganic gel which will bond with glass on firing, and refiring the impregnated product to a temperature at least sufficient to melt the glass but below that which will fuse the refractory.

2. A process for forming strong molded ceramic products comprising the steps of compressing a mixture of finely divided inorganic refractory material and a finely divided glass to a pressure of at least about 5 tons per square inch, said refractory material having a fusing point above the melting point of the glass, firing the compressed mixture to a temperature above the melting point of the glass and below the fusing of the refractory to form a product having a porosity of between 0.5% and 25%, impregnating said product with a silicon compound which is at least partially hydrolyzed and refiring the impregnated product to a temperature at least sufficient to melt the glass but below that which will fuse the refractory.

3. The process of claim 2 wherein the silicon compound is ethyl silicate.

4. The process according to claim 1 wherein the glass is a boric oxide containing glass.

5. The process according to claim 1 wherein the glass is a lead oxide containing glass.

6. The process according to claim 1 wherein the glass is a lead borate containing glass.

7. A process for forming strong molded ceramic products comprising the steps of compressing a mixture of finely divided calcium fluoride and a finely divided glass to a pressure of at least about 5 tons per square inch, said glass having a melting point below the fusing point of the calcium fluoride, firing the compressed mixture to a temperature above the softening point of the glass and below the fusing point of the calcium fluoride to form a product having a porosity of between 0.5% and 25%, impregnating said product with a compound which is at least partially hydrolyzed and is in the form of an inorganic gel which will bond with glass on firing, and refiring the impregnated product to a temperature at least sufficient to melt the glass but below that which will fuse calcium fluoride.

8. A process for forming strong molded ceramic products comprising the steps of compressing a mixture of finely divided calcium fluoride and a finely divided glass to a pressure of at least about 5 tons per square inch, said calcium fluoride having a fusing point above the softening point of the glass, firing the compressed mixture to a temperature above the melting point of the glass and below the fusing point of the calcium fluoride, to form a product having a porosity of between 0.5% and 25%, impregnating said product with ethyl silicate which is at least partially hydrolyzed and refiring the impregnated product to a temperature at least sufficient to melt the glass but below that which will fuse the calcium fluoride.

9. The process according to claim 8 wherein the glass melts below 900° C.

10. The process according to claim 8 wherein the glass is a boric oxide containing glass present in an amount of at least 2% by weight of the total composition.

11. The process according to claim 8 wherein the glass is a lead oxide containing glass present in an amount of at least 2% by weight of the total composition.

12. The process according to claim 8 wherein the glass is a lead oxide and boric oxide containing glass.

13. A process for forming strong molded ceramic products comprising the steps of compressing a mixture of finely divided calcium fluoride and a lead oxide and boric oxide containing glass to a pressure of at least 20 tons per square inch, said glass being present in an amount of at least 2% by weight of the total composition, firing the compressed mixture to a temperature above the softening point of the glass and below the fusing point of the calcium fluoride to form a product having a porosity of between 0.5% and 25%, impregnating said product with ethyl silicate which is at least partially hydrolyzed and refiring the impregnating product to a temperature at least sufficient to melt the glass but below that which will fuse the calcium fluoride.

14. The process according to claim 1 wherein the temperature of firing is below that which will cause recrystallization of the refactory material.

EKKEHARD L. KREIDL.
JOSEPH L. UTTER.

REFERENCES CITED

The following references are of record in the file of this patent:

UNITED STATES PATENTS

| Number | Name | Date |
|---|---|---|
| 2,286,275 | Hood et al. | June 16, 1942 |
| 2,315,329 | Hood et al. | Mar. 30, 1943 |
| 2,340,013 | Nordberg et al. | Jan. 25, 1944 |
| 2,355,746 | Nordberg et al. | Aug. 15, 1944 |